US011374534B2

(12) United States Patent
Scherff

(10) Patent No.: US 11,374,534 B2
(45) Date of Patent: Jun. 28, 2022

(54) OPTOELECTRONIC SOLAR CELL TEST SYSTEM FOR AN IN-LINE SOLAR CELL PRODUCTION PLANT, AND METHOD FOR OPTIMIZING THE IN-LINE PRODUCTION OF SOLAR CELLS USING AN OPTOELECTRONIC SOLAR CELL TEST SYSTEM OF THIS TYPE

(71) Applicant: WAVELABS SOLAR METROLOGY SYSTEMS GMBH, Leipzig (DE)

(72) Inventor: Maximilian Scherff, Leipzig (DE)

(73) Assignee: WAVELABS SOLAR METROLOGY SYSTEMS GMBH, Leipzig (DE)

( * ) Notice: Subject to any disclaimer, the term of this patent is extended or adjusted under 35 U.S.C. 154(b) by 3 days.

(21) Appl. No.: 17/266,469

(22) PCT Filed: Aug. 7, 2019

(86) PCT No.: PCT/DE2019/100718
§ 371 (c)(1),
(2) Date: Feb. 5, 2021

(87) PCT Pub. No.: WO2020/030232
PCT Pub. Date: Feb. 13, 2020

(65) Prior Publication Data

US 2021/0305938 A1 Sep. 30, 2021

(30) Foreign Application Priority Data

Aug. 7, 2018 (DE) ........................ 102018119171.5

(51) Int. Cl.
*H02S 50/15* (2014.01)

(52) U.S. Cl.
CPC .................................. *H02S 50/15* (2014.12)

(58) Field of Classification Search
None
See application file for complete search history.

(56) References Cited

U.S. PATENT DOCUMENTS 9,645,180 B1 5/2017 Hoff
2011/0153228 A1* 6/2011 Ahmad ................ G01R 31/308 356/237.5

(Continued)

FOREIGN PATENT DOCUMENTS

CN 105915179 A * 8/2016
CN 105789082 B * 4/2018

*Primary Examiner* — Jay Patidar
*Assistant Examiner* — Haidong Zhang
(74) *Attorney, Agent, or Firm* — Christensen, Fonder, Dardi & Herbert PLLC

(57) ABSTRACT

An optoelectronic solar cell test system including an exposure and measuring device for in-line measurement of solar cells and a control and evaluation unit, the exposure and measuring device configured to carry out test measurements for generating test-measurement data on a solar cell. The control and evaluation unit is configured to perform statistical analyses using data from identical test measurements undertaken by the exposure and measuring device on a plurality of solar cells produced in-line, and to correlate statistical analyses of the data from different test measurements with one another, and/or to correlate statistical analyses of test measurement data with statistical analyses of production measurement data, and/or to correlate statistical analyses of test measurement data and/or statistical analyses of production measurement data with production input data, in order generate correlation results, and to derive from the correlation results, and communicate, an action recommendation or instruction to a personnel group.

15 Claims, 2 Drawing Sheets

(56) References Cited

U.S. PATENT DOCUMENTS

2012/0130520 A1 5/2012 Parikh et al.
2016/0245741 A1* 8/2016 Krishnan .............. G01N 21/55

* cited by examiner

OPTOELECTRONIC SOLAR CELL TEST SYSTEM FOR AN IN-LINE SOLAR CELL PRODUCTION PLANT, AND METHOD FOR OPTIMIZING THE IN-LINE PRODUCTION OF SOLAR CELLS USING AN OPTOELECTRONIC SOLAR CELL TEST SYSTEM OF THIS TYPE

RELATED APPLICATIONS

The present application is a National Phase entry of PCT Application No. PCT/DE2019/100718, filed Aug. 7, 2019, which claims priority to German Patent Application No. 10 2018 119 171.5, filed Aug. 7, 2018, the disclosures of which are hereby incorporated by reference herein in their entirety.

FIELD OF THE INVENTION

The invention relates to an optoelectronic solar cell test system for an in-line solar cell production plant. The invention furthermore relates to a method for optimizing the in-line production of solar cells by using such an optoelectronic solar cell test system.

BACKGROUND OF THE INVENTION

Optoelectronic solar cell test systems comprise a system, referred to in technical jargon as a "flasher", having an exposure and measuring device. This exposure and measuring device is coupled to a control and evaluation unit, and is conventionally located at the end of the in-line production plant for quality measurement of the solar cells produced. Such a system is known, for example, from DE112012006365T5.

The exposure and measuring device is configured and adapted to carry out one or more test measurements on a solar cell in order to generate test measurement data, the test measurements being selected from the group consisting of:

- infrared image measurement of a solar cell energized in the reverse direction in order to determine local short circuits in the solar cell,
- flash exposure with an exposure spectrum, in particular a simulated solar spectrum, in order to measure at least one current-voltage characteristic curve of the solar cell,
- a multiplicity of spectrally differentiated flash exposures in order to measure spectrally resolved current characteristic curves of the solar cell and/or in order to measure a quasi-external quantum efficiency of the solar cell,
- electroluminescence measurement of the solar cell, particularly in order to determine microcracks in the solar cell material and/or in order to determine electrode structure interruptions and/or contact problems between electrode structures and the substrate and/or in order to determine electrically inactive regions and/or local short circuits,
- measurement of the bright characteristic curve and measurement of the dark characteristic curve of the solar cell in order to calculate the series resistance of the solar cell, and
- resistance measurement of the electrode structures of the solar cell comprising electrode fingers in order to determine the quality of the metal electrode structures.

By the spectrally differentiated flash exposures, a quasi-external quantum efficiency of the solar cell is obtained. For a flash exposure in the blue spectral range, insufficiencies in the measurement result of a wafer solar cell indicate problems with the nitride layer or the emitter. For a flash exposure in the red spectral range, poor bulk material of the wafer or a poor quality of the backside passivation layer may be identified.

The interruptions and/or contact problems between electrode structures and the substrate, identified by the electroluminescence measurement, may occur both on its front side and on its rear side, depending on the structural design of the solar cell. Electrically inactive regions are caused in wafer solar cells by damaged or poor-quality substrate material. Local short circuits of the p-n junction may occur in wafer solar cells by the pn junction being short circuited, for example, by a so-called etch wraparound at the edge of the solar cell.

Along a solar cell in-line production plant composed of a multiplicity of sequenced process devices, there are conventionally different process measuring devices which monitor or document the production operation. For the production of wafer-based solar cells, these include in particular process measuring devices for recording wafer resistivity, wafer thickness, wafer weight, wafer TTV (total thickness variation), wet chemical etching removal, composition of the wet chemistry, minority charge carrier lifetime of the wafer, conductivity and homogeneity of diffusion layers, layer thicknesses and refractive index of antireflection and/or passivation layers, homogeneity of antireflection and/or passivation layers, etch wraparound in the case of single-sided etching steps, application quantity and position of metallization pastes, errors in the print image of the pastes and many more, depending on the automation level and layout of the production line. With the aid of production measurements, these process measuring devices determine, and usually store, production measurement data. Optionally, alarms are triggered in the event of excessive deviations of the production measurement data from defined setpoint values. Production measurement data, which represent parameters of the processing method respectively taking place in the process device, are generated with the aid of further production measurements. These are in particular data relating to temporal and/or spatial profiles of temperature, pressure, processing time, etc. Production measurement data are created in process devices either by production measurements on the partially manufactured solar cell or by production measurements of parameters of the processing method taking place in the process device.

Besides further activities, employees of the in-line solar cell production plant can and should observe these characteristic values obtained from production measurement data, when they find time to do so, and where necessary according to their knowledge and competence carry out corrections to the respective processing method of the process device or report abnormalities to another employee for further action. Usually, even in the event of relatively major problems, the in-line production continues without reduction until the responsible technical staff have arrived and begin the fault tracing. Hours may quite possibly pass before the technical staff arrive. It is even worse when the problems are not noticed by the production staff at work at the process devices of the in-line production plant, or they are not passed on. This may be because of poor training, or the staff have for various reasons no motivation to report the identified problems. There may likewise be too many parallel tasks for the production staff, so that the equipment of the process devices with the subjectively perceived greatest problems are prioritized. In such scenarios, further likewise very relevant problems are, for example, not brought to the attention of the more highly trained technical staff until the next shift change report. Since the in-line solar cell production conventionally runs round the clock, the resolution of many problems which have already occurred during the night is often not started until the morning, after the more highly qualified technical staff have arrived.

The production staff at work at the process devices of the in-line production plant usually have a relatively low training level and therefore not an in-depth understanding of processes and/or solar cells. At many sites, furthermore, there is a high turnover of this production staff of up to 50% per year. Correspondingly, production know-how cannot be sustainably built up and maintained. This conflicts with the fact that solar cell production is a highly complex multidisciplinary process with manifold influences on the many different solar cell parameters. These solar cell parameters may influence one another and thereby enhance or even compensate for certain effects, which makes the fault tracing for optimization of production even more difficult. The actual causes of process deviations are therefore often very difficult for the production staff to trace. Furthermore, in particular wafer solar cell structures are becoming more and more complex (PERC (Passivated Emitter and Rear Cell), IBC (Interdigitated Back Contact), HIT (Heterojunction with Intrinsic Thin layer)) and consequently react even more sensitively to process deviations, which affects the efficiency as well as the susceptibility to PID (Photo-Induced Degradation) or LeTID (Light and elevated Temperature Induced Degradation).

If the in-line production plant is not running optimally, the solar cells experience quality and/or efficiency losses. So that the efficiencies are particularly high, all process devices and processes must be adjusted optimally, which is possible only with a great deal of measurement technology and many highly trained staff. Both are expensive. Interpretation errors of the many measurement results, which also occur with a time delay for a cell, are probable and usual. It is likely that no in-line production plant in the world currently runs truly optimally over a prolonged period of time.

Along and at the end of the production process of solar cells, their cell parameters/characteristics are measured and documented. This is done primarily at so-called flashers, but also at process measuring devices which determine for example two-dimensional electroluminescence or photoluminescence or infrared images of the partially manufactured solar cell surface. It is also possible for these process measuring devices to represent trends, in order to make possible causes of quality problems more easily traceable. Often, however, the production staff lack the know-how and/or the time and/or the knowledge of current production modifications (different material batch of the substrate elements (for example wafers), wet bench for the texture etching has been refilled, etc.) to interpret the deviations of the results correctly. It is necessary to ask the technical staff, which leads to a time delay and therefore causes a lower quality (efficiency) or reduced production quantity (in the event of a production stoppage).

The technical staff must be trained in an interdisciplinary way or consist of several persons who currently cover all relevant technical problem areas of the entire production process. Depending on the actual level of knowledge, the problem which has occurred is not optimally solved or, depending on who tries to solve the problem, different solution approaches are proposed. The line does not run optimally until the actual cause has been traced.

Particularly when the technical staff are not immediately available, the extent of solar cell production affected by the performance loss is significant. Often, there are only few technical staff present or they have to resolve several problems at the same time. This problem is exacerbated when a plurality of partial lines operated in parallel cause problems simultaneously. A plurality of partial lines then no longer run optimally.

In order to save on production costs, maintenance intervals should furthermore be selected to be as long as possible. It follows from this that the occurrence of a no longer tolerable performance loss, or individual process devices and therefore the entire in-line production plant experiencing disruption, is waited for. In the case of disruption, the cause is clear. In the case of a performance loss, it must first be assigned to the process devices causing it. The performance loss may occur much earlier than usual, or it could have many different causes or a combination of causes. The assigning then becomes difficult. During the tracing of the cause, the in-line production plant does not run optimally.

It may also be that the in-line production plant is in fact adjusted perfectly but a performance loss has to some extent been induced deliberately, for example by using a less expensive starting material with lower quality or by reorganizing the process parameters, but this is not known to the production staff, for example because of insufficient communication. In such a case, it may be that an observed performance loss is misinterpreted and the production staff draw incorrect conclusions and adapt process parameters within or even outside their scope of activity. This would further impair the performance. This further impairment, however, depending on the place of the intervention, will be observed only with a significant time delay (an in-line production run may take several hours), when the finally produced solar cell is measured at the flasher of the cell testing device. This entails a significant fraction of inferior solar cells which have no longer been processed optimally.

An in-line solar cell production plant is conventionally organized as follows: for overseeing the in-line production plant, the following personal groups are generally used:

- the production staff, who look after the process devices running round the clock in shift operation, while immediately resolving minor process disruptions (for example removing a broken wafer) and carrying out upkeep in the form of maintenance work, but, even in the event of relatively major disruptions of the process devices, resolving these disruptions until the process device fails,
- the shift supervision staff, who take care of the tasks of the process devices and also organize the production staff for upkeep,
- the technical staff, who have expert knowledge for the individual process steps but are not permanently on site (for example during the late or night shift), consist of relatively few persons and assist with technical knowledge in the event of disruptions of the process devices, and
- the production supervision staff, who have the complete overview and responsibility for production.

The systems known from the prior art for testing produced solar cells therefore have the problem that deficiencies in the processing methods of the individual process devices are not identified, or are identified only insufficiently or inappropriately, and additionally with a time delay.

SUMMARY

The object of the present invention is therefore to provide an optoelectronic solar cell test system for an in-line solar cell production plant, which allows more reliable and more prompt deficiency identification in the individual processes of the in-line production plant, and countermeasures thereby initiated lead more rapidly and more reliably to resolution of the process deficiencies.

This object is achieved by an optoelectronic solar cell test system having the features of claim 1 and by a method having the features of claim 10 for optimizing the in-line production of solar cells by using such an optoelectronic solar cell test system.

According to the invention, the control and evaluation unit (20) is adapted and configured to carry out statistical analyses with test measurement data of the same test measurements, carried out by means of the exposure and measuring device on a plurality of solar cells produced in-line, and to correlate the statistical analyses of the test measurement data of different test measurements with one another and/or to correlate the statistical analyses of test measurement data with statistical analyses of production measurement data and/or to correlate the statistical analyses of test measurement data and/or the statistical analyses of production measurement data with production input data, in order to generate correlation results and to derive at least one handling proposal and/or at least one handling instruction, which are assigned to at least one person group involved in the in-line production of the solar cells, from the correlation results with the aid of derivation rules, the control and evaluation unit comprising a communication device which transmits the at least one handling proposal and/or the at least one handling instruction to the at least one assigned person group. Warnings and advice are also to be regarded as handling proposals or handling instructions according to their content formulation. For example, a warning advice implies the proposal or the instruction for increased attentiveness, which is outlined in more detail by the content of the warning advice.

For clear differentiation of test measurements which are carried out by means of the exposure and measuring device of the flasher on the finally produced solar cell, production measurements and the production measurement data resulting therefrom are such measurement data as are obtained from partially manufactured solar cells after or during individual process steps in the process devices of the in-line production plant. An in-line production plant for solar cells is formed from a series of these process devices. Each of these process devices may comprise one or more process measuring devices. By means of these process measuring devices, process measurements are carried out on the not yet finished and therefore only partially manufactured solar cells, and production measurement data are obtained in this way. In addition or as an alternative, the process measuring devices may also be configured to obtain production measurement data which are obtained not by measurements on the partially manufactured solar cells but by measurements on the processing method taking place in the respective process device. This means process parameters of the respective processing methods to which the partially manufactured solar cells are subjected at the respective process device.

In the terminology of this patent application, the test measurements carried out on finally produced solar cells for generating test measurement data are therefore to be differentiated from production measurements carried out on partially manufactured solar cells or on the respective processing method of the partial manufacturing step in order to generate production measurement data. Furthermore, the term production input data is also used. Production input data are, for example, material parameters of the substrate elements initially introduced in the form of semiconductor wafers into the in-line production process. From the substrate elements, partially manufactured and ultimately finally produced solar cells are produced in the in-line production process by the sequence of the process devices. Furthermore, production input data may be the material properties of consumable materials which are used in the respective process devices along the in-line production sequence for the processing methods taking place in the process devices. These are for example liquids for cleaning or removing surfaces, gases for depositing thin layers, or metal pastes for forming metallizations.

With the aid of this optoelectronic solar cell test system, not only are test measurement data, production measurement data and production input data recorded, represented and documented as usual, but the solar cell test system creates independently targeted messages which are configured as handling proposals or as handling instructions. These handling proposals or handling instructions are communicated to an assigned person group, depending on the respective content. The associated person group is one or more of the following person groups: production staff, shift supervision staff, technical staff and production supervision staff.

The handling proposals or handling instructions may contain tasks which are carried out or initiated directly or after checking further parameters by the associated person group themselves. The assigning of the handling proposals and/or the handling instructions to the associated person group is dictated by an information or responsibility hierarchy specific to the respective in-line production plant. The communication is carried out to different assigned person groups by means of a situation-adapted selection of the communication medium and of the communication time.

The test system allows fully or partially automated analysis of many characteristic values in the form of test measurement data, production measurement data and production input data, comprising overall data. Although these production data are not obtained from the in-line production plant, they are nevertheless relevant for the solar cells produced. They are, in particular, characteristic values of the starting substances processed in the in-line production plant and the consumable materials used.

Each performance loss of the solar cells produced, determined by means of the solar cell test system, has a clear "fingerprint" in the perspective of the analyzed overall data in the overall data space. The development of the respective specific "fingerprint" and the superposition of a plurality of such "fingerprints" in the overall data space are detected by evaluating the overall data. As part of the evaluation, the statistical analyses of the test measurement data and production measurement data and the production input data are preferably correlated. It is particularly advantageous to correlate the statistical analyses of the data of one or more imaging test and/or production measurement methods with non-imaging test and/or production measurement methods.

With this test system, the conspicuity of the production deviation and a performance loss resulting therefrom no longer depends on when the production employee looks at the results of the test measurements and/or production measurements again and actually notices the conspicuous data, and then also interprets them correctly. Further sources of delay consist of the human factor, where and when the technical staff specifically make their round or when the next routine reporting by the production staff to the technical staff is due in relation to the performance loss. The test system immediately indicates an observed deviation and proposes or instructs actions by means of the messages generated. This means that the test system gives the line staff direct indications, when necessary requires particular checks or measurements and/or takes over the guidance of the production staff temporarily until the technical staff arrive routinely or on request. With a message which comprises an alarm and is also documented, an employee belonging to the production staff may find it difficult to make the excuse that they noticed nothing or did not think of implementing this or that measure because the fault occurs so rarely, for example. By means of the messages generated by the test system prompt handling counteracting the performance deficiency is initiated, which leads to a significant saving of production costs by avoiding prolonged downtimes.

Furthermore, derivation rules newly to be added are directly ready for use and do not first need to be explained to the line staff by training.

Preferably, the optoelectronic solar cell test system is characterized in that the communication device is adapted and configured in such a way that

- a display apparatus arranged on the exposure and measuring device and/or
- a display apparatus arranged on the control and evaluation unit and/or
- a display apparatus arranged on a process device of the in-line solar cell production plant and/or
- a mobile digital terminal communicates the at least one handling proposal and/or the at least one handling instruction to the at least one assigned person group. The selection of the medium used for the communication of the handling proposal and the handling instruction is in this case carried out situation-dependently. If a plurality of person groups are assigned, the communication may be carried out with the same or different communication media.

The optoelectronic solar cell test system is advantageously refined so that the communication device is adapted and configured in such a way that the communication device selects the at least one specifically assigned person group as a function of the at least one derived handling proposal and/or the at least one derived handling instruction.

The handling proposals and handling instructions may be communicated in very different ways. For example, they may be sent automatically to the production staff respectively at work. The indications in the form of the handling proposals and handling instructions may be communicated by specific indicator lights, specific alarm sounds, display indications in text form or as a combination thereof. Depending on the nature and severity of the process deficiencies, the messaging may be carried out to person groups assigned to a larger circle of persons. In this case, the communication medium and the content of the messaging may vary. For example, a minor process deviation is only shown on the display as “attention” and has no instructional function for the production staff responsible for this process device. Major process deficiencies may for example be communicated by means of a special alarm sound, need to be acknowledged at a correspondingly configured interface and, in the form of a handling instruction, prompt the production staff to predetermined measures. In this case, there is a report to the shift supervision staff. In very serious cases, this could lead to the requirement for production stoppage which must only be confirmed by the production supervision staff. This may also be done remotely online.

In serious cases, the system may be authorized to direct the production staff, and there are usually handling proposals. Depending on the severity, these must be acknowledged and therefore confirmed. If this does not happen, the messaging is carried out to an alternative assigned person group in the same or a different way. Depending on the relevance of a message, the technical staff and/or a hierarchically higher circle of persons may be informed directly, digital terminals and communication via text/voice messages being suitable for this. The relevance may for example correlate with a threshold value being exceeded, or may be caused by a report to the production staff not being acknowledged. The manner of the messaging may escalate to a higher relevance level with an increasing duration of the process deficiency, for example by changing a handling proposal into a handling instruction.

Advantageously, the optoelectronic solar cell test system is characterized in that the control and evaluation unit is adapted and configured

- to carry out the statistical analyses of the production measurement data by means of received production measurement values of production measuring devices and/or
- to receive from production measuring devices the statistical analyses, generated in the production measuring devices, of the production measurement data. Said statistical analyses comprise conventional average and variance analyses. For the constantly carried out test measurements and production measurements, either they may be carried out centrally by the control and evaluation unit or these evaluations are already undertaken by correspondingly configured production measuring devices, which subsequently transmit the statistical evaluation results to the control and evaluation unit.

Preferably, the derivation rules are stored in a digital memory of the control and evaluation unit. The derivation rules which may be used depend on the available test measurements and production measurements. The activatable derivation rules are selected on the part of the technical staff.

Particularly preferably, the derivation rules are stored in the digital memory of the control and evaluation unit in such a way that they can be modified via a digital interface. This refinement has the advantage that new supplementary derivation rules and messages resulting therefrom in the form of handling proposals and/or handling instructions may be programmed in by the technical staff. Likewise, the technical staff may themselves determine further derivation rules and messages resulting therefrom by empirical observation of the system with its overall data in different correlation scenarios.

According to an advantageous refinement of the optoelectronic solar cell test system, the display apparatus of the exposure and measuring device and/or the display apparatus of the control and evaluation unit and/or the display apparatuses of the process devices and/or the mobile digital terminals are configured and adapted to receive a reception acknowledgement signal generated by the at least one specifically assigned person group. These reception acknowledgement signals are requested in the case of the communication of messages in the form of handling proposals and/or handling instructions. If requested acknowledgement confirmation signals do not arrive, the request is repeated. Depending on the relevance level of the message, if the reception acknowledgement signal still does not arrive, a further person group may be assigned and informed.

Preferably, the optoelectronic solar cell test system is characterized in that the display apparatus of the exposure and measuring device and/or the display apparatus of the control and evaluation unit and/or the display apparatus of the process device and/or at least one of the mobile digital terminals are configured and adapted to receive an evaluation signal, the evaluation signal communicating on the part of the at least one assigned person group whether the handling proposal generated by the control and evaluation unit and/or the handling instruction generated by the control and evaluation unit was appropriate in the view of the assigned person group. These evaluation signals are preferably evaluated on the part of the technical staff and are subsequently used to verify, and if necessary adapt or even discard, the derivation rules coming into use.

As an alternative, it is likewise possible simply to store the messages in the form of handling proposals and/or handling instructions generated after correlation of the statistical analyses of the data and the application of the derivation rules. Subsequently, the suitability of the messages may be checked and confirmed or rejected by technical staff. With the aid of this feedback, the derivation rules are then manually adapted and therefore optimized.

In one preferred refinement of the optoelectronic solar cell test system described above with evaluation signals, the control and evaluation unit is adapted and configured to carry out a statistical analysis between the generated handling proposals and handling instructions and the evaluation signals obtained in response thereto, and to verify and adapt the derivation rules in use on the basis of these statistical analyses. In this variant, the above-described evaluation work of the technical staff is mostly or entirely automated in order to provide a self-learning system. To this end, systems with artificial intelligence may be used and trained, for example by using neural networks.

The object of the invention is also achieved by a method for optimizing the production of solar cells by means of an in-line solar cell production plant by using an optoelectronic solar cell test system as described above. The in-line solar cell production plant is, as explained above, composed of a multiplicity of process devices having process measuring devices for carrying out production measurements, so as to generate production measurement data.

Preferably, the method for optimizing the in-line production of solar cells is refined in that

- the statistical analyses of the test measurement data of different test measurements are correlated with one another and/or
- the statistical analyses of the test measurement data of test measurements are correlated with statistical analyses of production measurement data and/or
- the statistical analyses of test measurement data are correlated with production input data, and/or the statistical analyses of production measurement data are correlated with production input data, in order to generate correlation results and to derive at least one handling proposal and/or at least one handling instruction, which are assigned to at least one person group involved in the in-line production of the solar cells, from the correlation results with the aid of derivation rules, and the at least one handling proposal and/or the at least one handling instruction is transmitted to the at least one assigned person group. From the correlation of the various data groups with one another and the images resulting therefrom in the overall data space, the imminence of performance losses may already be predicted, even if the partially manufactured solar cell in the in-line production sequence has not yet advanced to the test measurement. In this way, such performance losses may be counteracted earlier.

Preferably, the method for optimizing the in-line production of solar cells is refined in that the derivation rules of the optoelectronic solar cell test system are checked and adapted by a feedback system with the aim of producing solar cells with optimized quality, the feedback system being supplied with feedback information by at least one person group involved in the in-line production of the solar cells. Particularly preferably, the technical staff are allotted to this task with comprehensive knowledge of the relationships and much empirically obtained experience of the production plant. Entirely manual optimization or partially automated optimization may be carried out. In the case of partially automated optimization, the system already proposes certain modifications of the derivation rules, which are confirmed, adapted or discarded on the part of the technical staff. In this case, systems with artificial intelligence are used and trained, for example by using neural networks.

According to a further advantageous variant of the method for optimizing the in-line production of solar cells, the derivation rules are checked and adapted by an automated optimization program. The responsible technical staff may still be used for plausibility monitoring of the checked and adapted derivation rules.

A preferred refinement of the method for optimizing the in-line production of solar cells is characterized in that handling proposals and/or handling instructions to which there is no response on the part of the assigned person group after an acknowledgement time has elapsed are communicated with a higher noticeability or a higher relevance level and/or communicated to further person groups. In this way, prompt response to the messages generated by the test system is ensured. The inadvertent overlooking or the intentional ignoring of messages are therefore reduced in their likelihood, as is the response time for initiating countermeasures in the event of impending or already started performance losses of the solar cells produced in the in-line production plant.

Advantageously, the method for optimizing the in-line production of solar cells is refined so that data patterns which indicate signs of wear and/or a maintenance requirement of process devices are determined from the correlation results generated. Signs of wear and a maintenance requirement for process devices are made noticeable earlier in the multidimensional consideration of the overall data space of the test measurements and production measurements, so that a production stoppage with a prolonged production downtime can be avoided because the corresponding precautions for maintenance or the worn part to be replaced can already be prepared in order to be able to respond quickly when required. In this way, downtimes of the in-line production plant are reduced further and production costs are therefore lowered.

BRIEF DESCRIPTION OF THE DRAWINGS

Further aspects of the invention will be explained with the aid of a purely exemplary embodiment of the test system and of the method for optimizing the in-line production of solar cells by using such a test system with the aid of the appended figures, in which.

DETAILED DESCRIPTION

Figure 1:
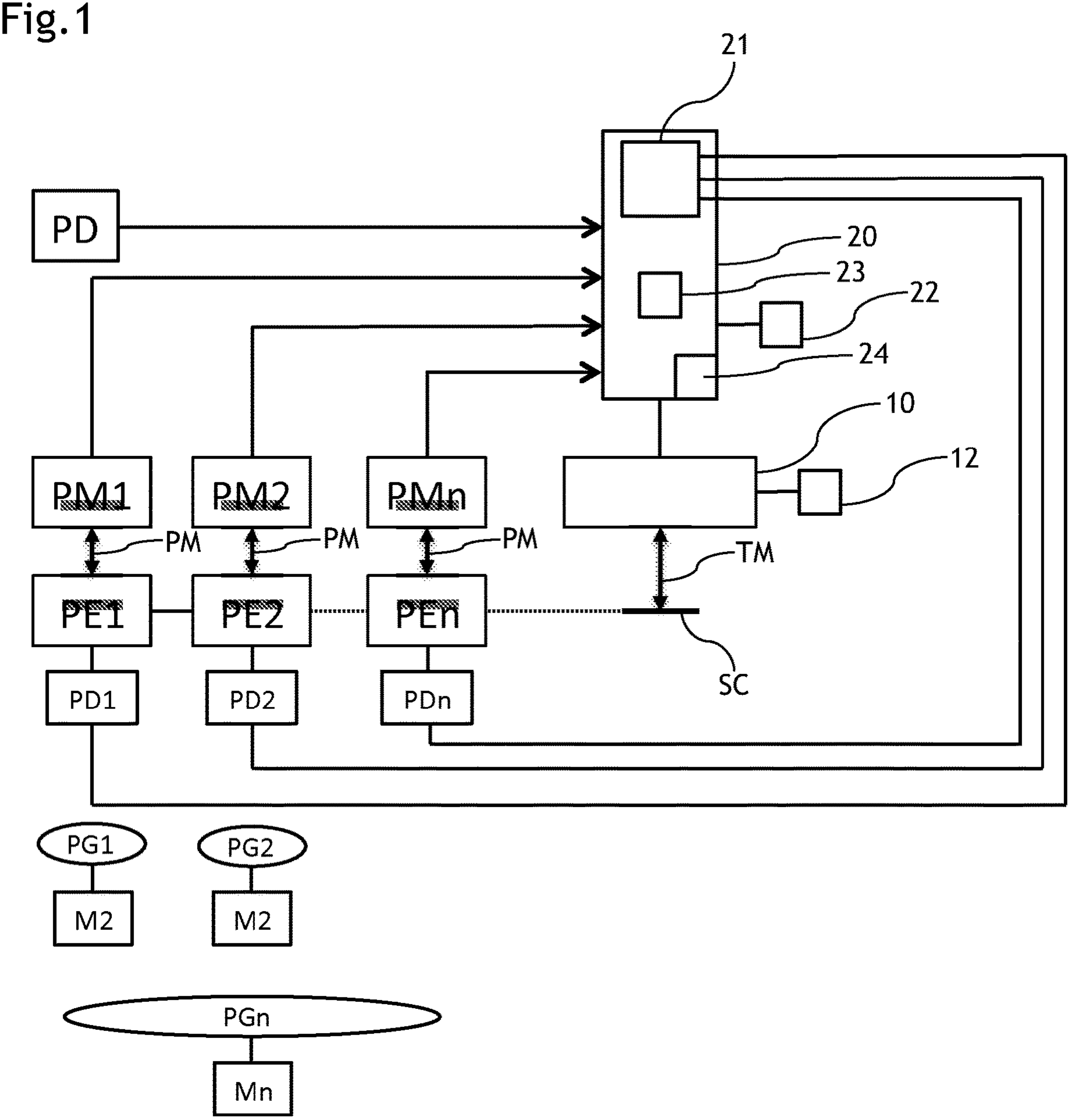
FIG. 1 shows an exemplary embodiment of an optoelectronic solar cell test system integrated into an in-line solar cell production plant in a purely schematic representation.

An in-line solar cell production plant is represented here schematically and by way of example by the linear sequence of a multiplicity of process devices PE1, PE2, PEn. In such an in-line production plant, for example, solar cells SC may be produced on the basis of semiconductor wafers. The finally produced solar cells SC are measured by means of an exposure and measuring device 10 for determining their quality parameters. The exposure and measuring device 10 is part of an optoelectronic solar cell test system, which is also referred to in technical jargon as a "flasher". In order to determine the quality parameters, a series of test measurements are usually carried out in order to generate test measurement data TM.

The test measurement data TM determined from the respective solar cells SC are fed to a control and evaluation unit 20 assigned to the test system. This control and evaluation unit 20 furthermore receives production measurement data PM from each process device PE1, PE2, PEn, which is equipped with at least one production measuring device PM1, PM2, PMn assigned to it. Each of the production measuring devices PM1, PM2, PMn respectively generates specific production measurement data PM. These production measurement data PM are in turn fed to the control and evaluation unit 20 of the test system.

In this case, a certain degree of evaluation of the production measurement data PM generated at the respective production measurement devices PM1, PM2, PMn may already be carried out on the part of the production measurement devices PM1, PM2, PMn. The production measurement devices PM1, PM2, PMn are then configured in such a way that they not only generate the production measurement data PM but also process them further by means of their own evaluation units. This furthermore leads to production measurement data PM which, however, are fed already in a fully or partially processed form to the control and evaluation unit 20. During this full or partial processing of the process measurement data PM, statistical analyses of the process measurement data PMstat are created. For example, this involves the formation of time averages and/or variance analysis values. For lack of corresponding evaluation units of the production measurement devices PM1, PM2, PMn, however, such analyses may likewise be carried out centrally in the control and evaluation unit 20 of the optoelectronic solar cell test system. The control and evaluation unit 20 may be closely coupled structurally to the exposure and measuring device 10. It is likewise conceivable for this functionality to take place spatially decoupled from the place where the test measurement data TM are generated. It is only necessary to ensure that the test measurement data TM are fed to the control and evaluation unit 20.

The production measurement data PM may be generated by various measurements in the region of the process devices PE1, PE2, PEn. These are in particular measurements on the partially processed solar cell SC in the respective process device PE1, PE2, PEn. As an alternative or in addition, the production measurement devices PM1, PM2, PMn of the process devices also generate production measurement data PM in the form of process parameters of the processing method taking place in the respective process devices PE1, PE2, PEn. For quality assurance, it is in any case necessary to monitor these process parameters by measurements. To this extent, the production measurement devices PM1, PM2, PMn of all embodiments of the optoelectronic solar cell test system are configured and adapted in such a way that they generate and provide many types of production measurement data of one or other variant.

As a further data flow, so-called production input data PED are fed to the control and evaluation unit 20. These are material parameters both of the raw materials used, which are processed further to form solar cells, and material parameters of the consumable materials which are used in the individual processing methods of the respective process devices PE1, PE2, PEn.

In the entirety of the data space which is available to the control and evaluation unit 20, the latter carries out statistical analyses and correlates them with one another. From the analyses and/or correlations of the data, handling proposals or handling instructions are generated with the aid of derivation rules. This method will be explained in more detail below in connection with FIG. 2. These handling proposals or handling instructions are transferred by means of a communication device 21 belonging to the test system to display apparatuses PD1, PD2, PDn of the process devices PE1, PE2, PEn and displayed there. In addition or as an alternative, the handling proposals or handling instructions may also be displayed on a display apparatus 22 belonging to the control and evaluation unit 20 or on a display apparatus 12 belonging to the exposure and measuring device 10.

In particular, the handling proposals or handling instructions are brought to the attention of various person groups PG1, PG2, PGn along the in-line solar cell production plant by means of the display apparatuses of the process devices PD1, PD2, PDn. In addition or as alternative to the display apparatuses of the process devices PD1, PD2, PDn, the handling instructions may also be transmitted wirelessly by means of the communication device 21 to mobile terminals M1, M2, Mn of the respectively assigned person groups PG1, PG2, PGn.

The control and evaluation unit 20 furthermore comprises a digital memory 23 in which the derivation rules are stored. In this embodiment, a digital interface 24 of the control and evaluation unit 20 is furthermore provided, by means of which the derivation rules may be modified by an instrument to be connected.

Figure 2:
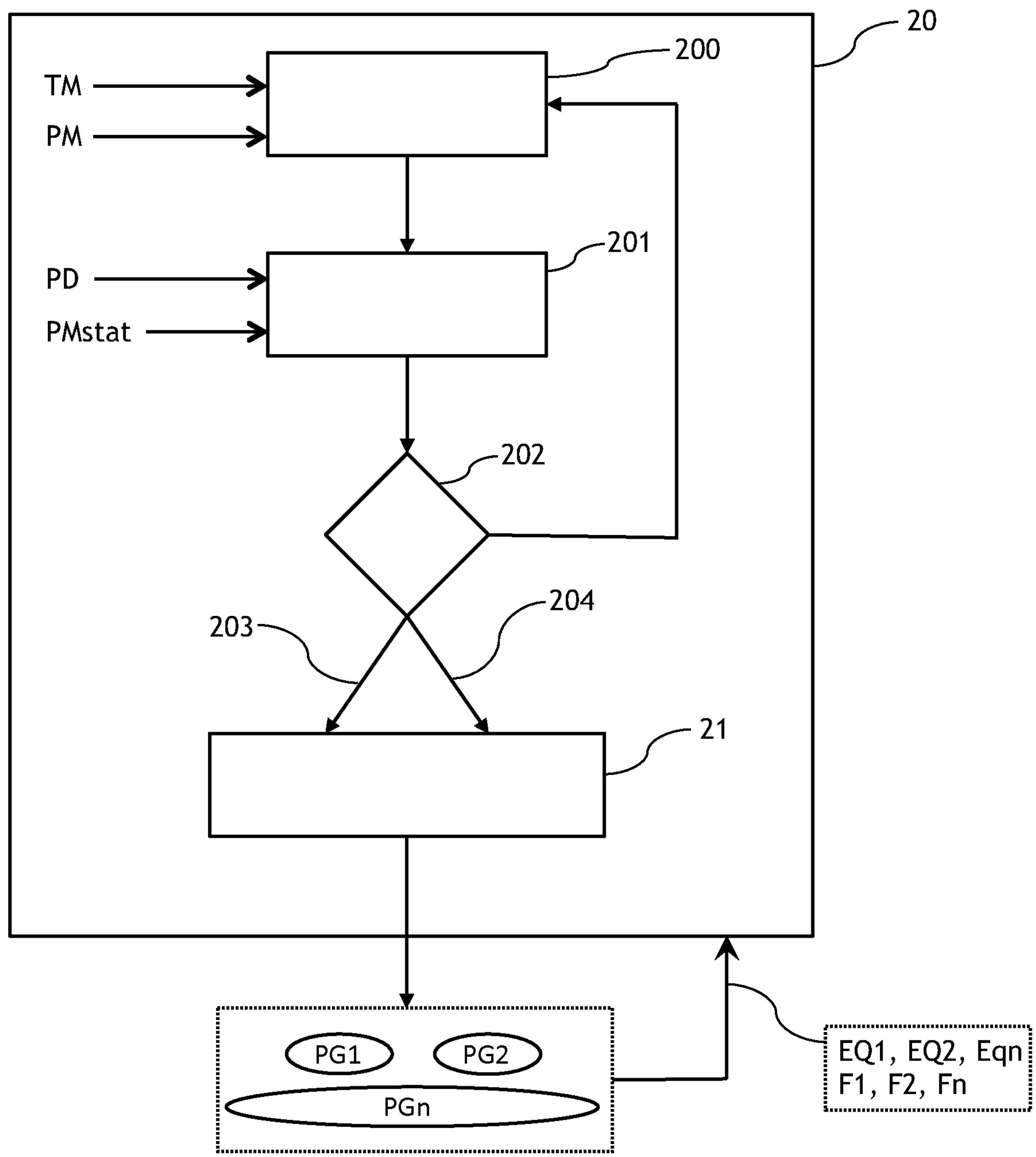
FIG. 2 shows an exemplary embodiment of a method for optimizing the production of solar cells by means of an in-line solar cell production plant by using an optoelectronic solar cell test system as represented particularly in FIG. 1.

FIG. 2 shows an exemplary embodiment of a method for optimizing the production of solar cells by means of an in-line solar cell production plant by using an optoelectronic solar cell test system as represented particularly in FIG. 1. This method is functionally carried out in the control and evaluation unit 20 of the solar cell test system. To this end, statistical analyses of the test measurement data TM provided by the exposure and measuring device 10 of the solar cell test system, which are referred to as TMstat, are carried out in the control and evaluation unit 20. Such statistical analyses may also be carried out with the production measurement data PM generated on the part of the production measurement devices PM1, PM2, PMn. As described above, the production measurement devices PM1, PM2, PMn carry out measurements in the scope of the processing method taking place in the respective process devices PE1, PE2, PEn and provide the obtained measurement values as production measurement data PM. The statistical analyses of the production measurement data PMstat may already be generated by corresponding evaluation units of the production measurement devices PM1, PM2, PMn and/or by the control and evaluation unit 20 of the solar cell test system. There are therefore statistical analyses of the test measurement data TMstat, statistical analyses of the production measurement data PMstat and the above-described production input data PED. From these data, correlation analyses 201 are carried out within the control and evaluation unit 20 in order to generate correlation results. These correlation results are processed in a further method step by using derivation rules 202. As a result, the application of the derivation rules 202 delivers at least one handling proposal 203 and/or at least one handling instruction 204, and/or further test measurement data TM or production measurement data PM or at least one further correlation selected from the statistical analyses of the test measurement data TMstat, the statistical analyses of the production measurement data PMstat, and the production input data PED, are requested before new application of the derivation rules 202 to the correlation results 201 takes place. Generated handling proposals 203 and handling instructions 204 are transmitted by means of the communication device 21 of the control and evaluation unit 20 to the various person groups PG1, PG2, PGn who are at work in various task areas within the in-line solar cell production plant. These person groups PG1, PG2, PGn preferably generate reception acknowledgement signals EQ1, EQ2, EQn, which confirm that the handling proposals 203 and/or handling instructions 204 have been noted. Preferably, evaluation signals which are related to the previously received handling proposals 203 and handling instructions 204 are furthermore generated on the part of the various person groups PG1, PG2, PGn. In this way, by a kind of feedback loop, the control and evaluation unit 20 is intended to be made aware whether and to what extent the received handling proposals 203 and/or handling instructions 204 have been categorized as appropriate on the part of the various person groups PG1, PG2, PGn. This feedback loop may be used to equip the control and evaluation unit 20 with a self-learning functionality.

LIST OF REFERENCES

10 exposure and measuring device
12 display apparatus of the exposure and measuring device
20 control and evaluation unit
200 statistical analyses of test measurement data and production measurement data
201 correlation results obtained from the correlation of statistical analyses of test measurement data and/or statistical analyses of production measurement data and/or production input data
202 application of derivation rules to correlation results
203 handling proposal
204 handling instruction
205 feedback system
21 communication device
22 display apparatus of the control and evaluation unit
23 digital memory of the control and evaluation unit
24 digital interface of the control and evaluation unit
PE1, PE2, PEn process devices of the in-line solar cell production plant
PM1, PM2, PMn production measuring devices of the process devices
PD1, PD2, PDn display apparatuses of the process devices
TM test measurement data
TMstat statistical analyses of the test measurement data
PM production measurement data
PMstat statistical analyses of the production measurement data
PED production input data
PG1, PG2, PGn assigned person groups
M1, M2, Mn mobile terminals of the assigned person groups
EQ1, EQ2, EQn reception acknowledgement signals generated by person groups
F1, F2, Fn evaluation signals communicated by person groups
SC solar cell

The invention claimed is:

1. An optoelectronic solar cell test system for an in-line solar cell production plant, the solar cell test system comprising:

an exposure and measuring device for in-line measurement of solar cells, and a control and evaluation unit coupled to the exposure and measuring device, the exposure and measuring device being configured and to carry out one or more test measurements on a solar cell in order to generate test measurement data, the test measurements being selected from the group consisting of:

infrared image measurement of a solar cell energized in the reverse direction in order to determine local short circuits in the solar cell, flash exposure with an exposure spectrum in order to measure at least one current-voltage characteristic curve of the solar cell, a multiplicity of spectrally differentiated flash exposures in order to measure spectrally resolved current characteristic curves of the solar cell and/or in order to measure a quasi-external quantum efficiency of the solar cell, electroluminescence measurement of the solar cell, particularly in order to determine microcracks in the solar cell material and/or in order to determine electrode structure interruptions and/or contact problems between electrode structures and the substrate and/or in order to determine electrically inactive regions and/or local short circuits, measurement of the bright characteristic curve and measurement of the dark characteristic curve of the solar cell in order to calculate the series resistance of the solar cell, and resistance measurement of the electrode structures comprising electrode fingers in order to determine the quality of the metal electrode structures, wherein the control and evaluation unit is configured to carry out statistical analyses with test measurement data of the same test measurements, carried out by means of the exposure and measuring device on a plurality of solar cells produced in-line, and to correlate the statistical analyses of the test measurement data of different test measurements with one another and/or to correlate the statistical analyses of test measurement data with statistical analyses of production measurement data and/or to correlate the statistical analyses of test measurement data and/or the statistical analyses of production measurement data with production input data, in order to generate correlation results and to derive at least one handling proposal and/or at least one handling instruction, which are assigned to at least one person group involved in the in-line production of the solar cells, from the correlation results with the aid of derivation rules, the control and evaluation unit comprising a communication device which transmits the at least one handling proposal and/or the at least one handling instruction to the at least one assigned person group.

2. The optoelectronic solar cell test system as claimed in claim 1, wherein the communication device is configured in such a way that:

a display apparatus arranged on the exposure and measuring device and/or a display apparatus arranged on the control and evaluation unit and/or a display apparatus arranged on a process device of the in-line solar cell production plant and/or a mobile digital terminal communicates the at least one handling proposal and/or the at least one handling instruction to the at least one assigned person group.

3. The optoelectronic solar cell test system as claimed in claim 2, wherein the communication device is configured in such a way that the communication device selects the at least one specifically assigned person group as a function of the at least one derived handling proposal and/or the at least one derived handling instruction.

4. The optoelectronic solar cell test system as claimed in claim 2, wherein the control and evaluation unit is adapted and configured:

to carry out the statistical analyses of the production measurement data using received production measurement values of production measuring devices and/or to receive from production measuring devices, the statistical analyses, generated in the production measuring devices, of the production measurement data.

5. The optoelectronic solar cell test system as claimed in claim 2, wherein the derivation rules are stored in a digital memory of the control and evaluation unit.

6. The optoelectronic solar cell test system as claimed in claim 5, wherein the derivation rules are stored in the digital memory of the control and evaluation unit in such a way that they can be modified via a digital interface.

7. The optoelectronic solar cell test system as claimed in claim 2, wherein the display apparatus of the exposure and measuring device and/or the display apparatus of the control and evaluation unit and/or the display apparatuses of the process devices and/or the mobile digital terminals are configured and adapted to receive a reception acknowledgement signal generated by the at least one specifically assigned person group.

8. The optoelectronic solar cell test system as claimed in claim 2, wherein the display apparatus of the exposure and measuring device and/or the display apparatus of the control and evaluation unit and/or the display apparatus of the process device and/or at least one of the mobile digital terminals are configured and adapted to receive an evaluation signal, the evaluation signal communicating on the part of the at least one assigned person group whether the handling proposal generated by the control and evaluation unit and/or the handling instruction generated by the control and evaluation unit was appropriate in the view of the assigned person group.

9. The optoelectronic solar cell test system as claimed in claim 8, wherein the control and evaluation unit is adapted and configured to carry out a statistical analysis between the generated handling proposals and handling instructions and the evaluation signals obtained in response thereto, and to verify and adapt the derivation rules on the basis of these statistical analyses.

10. A method for optimizing the production of solar cells by an in-line solar cell production plant by using an optoelectronic solar cell test system as claimed in claim 1, wherein the in-line solar cell production plant comprises a multiplicity of process devices having process measuring devices for generating production measurement data.

11. The method for optimizing the in-line production of solar cells as claimed in claim 10, wherein the statistical analyses of the test measurement data of different test measurements are correlated with one another and/or the statistical analyses of the test measurement data of test measurements are correlated with statistical analyses of the production measurement data of production measurements and/or the statistical analyses of test measurement data are correlated with production input data, and/or the statistical analyses of production measurement data are correlated with production input data, in order to generate correlation results and to derive at least one handling proposal and/or at least one handling instruction, which are assigned to at least one person group involved in the in-line production of the solar cells, from the correlation results with the aid of derivation rules, and the at least one handling proposal and/or the at least one handling instruction is transmitted to the at least one assigned person group.

12. The method for optimizing the in-line production of solar cells as claimed in claim 11, wherein the derivation rules of the optoelectronic solar cell test system are checked and adapted by a feedback system with the aim of producing solar cells with optimized quality, the feedback system being supplied with feedback information by at least one person group involved in the in-line production of the solar cells.

13. The method for optimizing the in-line production of solar cells as claimed in claim 12, wherein the derivation rules are checked and adapted by an automated optimization program.

14. The method for optimizing the in-line production of solar cells as claimed in claim 10, wherein handling proposals and/or handling instructions to which there is no response on the part of the assigned person group after an acknowledgement time has elapsed are communicated with a higher noticeability or a higher relevance level and/or communicated to further person groups.

15. The method for optimizing the in-line production of solar cells as claimed in claim 10, wherein data patterns which indicate signs of wear and/or maintenance requirement of process devices are determined from the correlation results generated.

* * * * *